United States Patent
Emmert et al.

[11] Patent Number: 6,085,350
[45] Date of Patent: Jul. 4, 2000

[54] SINGLE EVENT UPSET TOLERANT SYSTEM AND METHOD

[75] Inventors: Steven Robert Emmert, Chandler; Paul Robert Handly, Gilbert; Erwin Perry Comer, Queen Creek; Jason Jonathon Moore, Mesa, all of Ariz.

[73] Assignee: Motorola, Inc., Schaumburg, Ill.

[21] Appl. No.: 09/034,282

[22] Filed: Mar. 4, 1998

[51] Int. Cl.[7] .............................. G06F 11/08; G06F 7/02
[52] U.S. Cl. ........................................... 714/797; 714/820
[58] Field of Search .................................. 714/797, 6, 7, 714/8, 25, 47, 48, 819, 820

[56] References Cited

U.S. PATENT DOCUMENTS

| | | | |
|---|---|---|---|
| 5,297,052 | 3/1994 | McIntyre et al. | 364/453 |
| 5,537,583 | 7/1996 | Truong | 714/6 |
| 5,630,046 | 5/1997 | Loise | 714/820 X |
| 5,903,717 | 5/1999 | Wardrop | 714/6 |

*Primary Examiner*—Hoa T. Nguyen
*Attorney, Agent, or Firm*—Gregory J. Gorrie

[57] ABSTRACT

An single event upset (SEU) tolerant system for detecting and correcting an SEU includes a decision element (200) for receiving a plurality of outputs (120) from a plurality of signal generators (105) and producing an output (130) therefrom. The decision element includes voters which provide two levels of voting for the plurality of redundant outputs (120). First-level voters (300) provide intermediate voted outputs (315) which are received by a second-level voter to determine an output (130). An output disabler (400) determines when an output is provided external to the decision element. A plurality of comparators (210) receive intermediate voted outputs (315) from first-level voters and compare with a plurality of outputs from a plurality of signal generators to determine upset detected signals (125). An upset detected signal controls the selection of feedback for an element having experienced an SEU.

17 Claims, 3 Drawing Sheets

SINGLE EVENT UPSET TOLERANT SYSTEM AND METHOD

LICENSE RIGHTS

The U.S. Government has a paid-up license in this invention as provided for by the terms of Contract Numbers. MDA904-95-G-0253-5002 and MDA904-95-C-5014 awarded by the National Security Agency.

FIELD OF THE INVENTION

This invention relates in general to the field of systems tolerant to radiation and, in particular, to systems tolerant to radiation induced single event upsets.

BACKGROUND OF THE INVENTION

Reliable, single event upset (SEU) tolerant systems are important to many applications. In particular, space borne applications having high speed communication rates frequently experience single event upsets in a high radiation environment. Additionally, many space borne applications having high speed communications need synchronization with ground equipment. Some applications needing synchronization with ground equipment include direct-sequence spread spectrum systems, frequency hopping systems, and synchronous stream encryption systems. A significant problem with some space borne applications needing synchronization with ground equipment occurs when a system element, such as a pseudo-noise generator, experiences an single event upset due to radiation.

Problems with maintaining synchronization between space borne applications and ground equipment typically increase as communication rates increase. Fast switching semiconductor technologies such as gallium arsenide (GaAs) and emitter coupled logic (ECL) are commonly used in high speed systems. In many space environments, elements fabricated using GaAs and ECL are highly susceptible to a radiation induced SEU. A problem with experiencing an SEU in a non-voting system is loss of synchronization between a transmitter and a receiver. Current systems typically counteract a loss of synchronization between transmitter and receiver by having the receiver alert the transmitter of the problem. During a loss of synchronization, an irretrievable data loss occurs. While voting systems have been used to solve a problem of lost synchronization, voting systems are susceptible to hard (e.g., hardware) failures.

Another problem with applications experiencing an SEU is security. For example, in data encryption applications, cautionary measures are commonly taken to avoid an inadvertent escape of sensitive data. Cautionary measures include automatic shut-off of output data when any processing discrepancy is detected. Such cautionary measures are a problem with a goal of uninterrupted communications between a transmitter and a receiver.

Thus, what is needed are a system and method tolerant to an SEU. What is also needed are a system and method capable of maintaining synchronization between a transmitter and a receiver after experiencing an SEU. What is also needed are a system and method which maintain continuous communications between a transmitter and a receiver following an SEU. What is also needed is a voter system which is tolerant of hard failures.

BRIEF DESCRIPTION OF THE DRAWINGS

The invention is pointed out with particularity in the appended claims. However, a more complete understanding of the present invention may be derived by referring to the detailed description and claims when considered in connection with the figures, wherein like reference numbers refer to similar items throughout the figures, and:

The exemplification set out herein illustrates a preferred embodiment of the invention in one form thereof, and such exemplification is not intended to be construed as limiting in any manner.

DETAILED DESCRIPTION OF THE DRAWINGS

The present invention provides a system and method tolerant to an SEU. The present invention also provides a system and method capable of maintaining synchronization between a transmitter and a receiver after experiencing an SEU. The present invention also provides a system and method which maintain continuous communications between a transmitter and a receiver following an SEU. The present invention also provides a voter system which is tolerant of hard failures.

Figure 1:
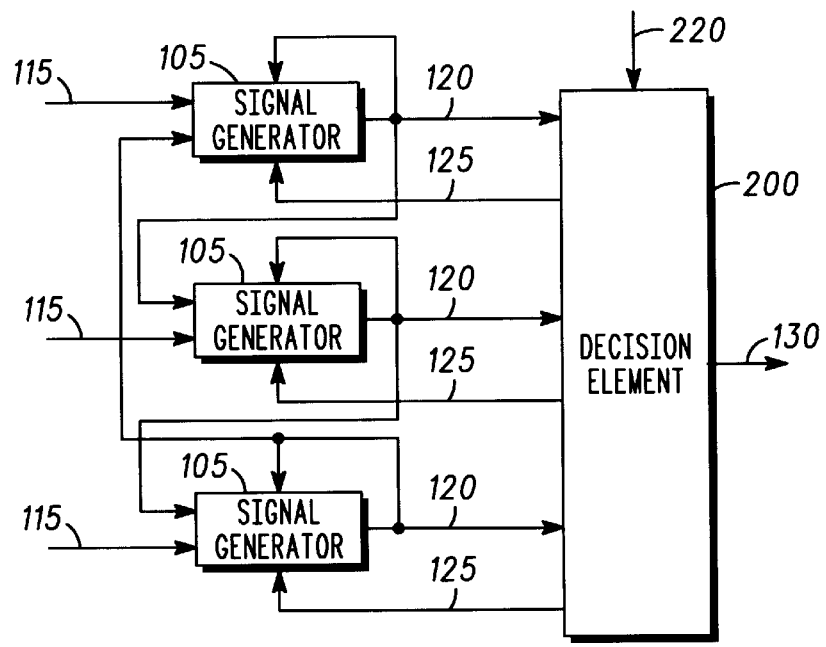
FIG. 1 is a simplified block diagram of an SEU tolerant system in accordance with a preferred embodiment of the present invention.

FIG. 1 is a simplified block diagram of an SEU tolerant system in accordance with a preferred embodiment of the present invention. SEU tolerant system 100 illustrates a system capable of identifying and correcting an SEU. In a preferred embodiment, SEU tolerant system 100 includes signal generators 105 coupled to decision element 200 via outputs 120 and upset detected signals 125.

In a preferred embodiment, each of signal generators 105 accepts at least one of inputs 115 and generates at least one of outputs 120. Preferably, inputs 115 represent independent inputs, and outputs 120 represent independent outputs. In one embodiment of the present invention, inputs 115 represent red (e.g., plain text) data flowing into signal generators 105, and outputs 120 represent black (e.g., encrypted text) flowing out of signal generators 105. Preferably, upset detected signals 125 represent an upset detected signal determined by decision element 200. In a preferred embodiment, voted output 130 represents a single output from decision element 200. Preferably, voted output 130 is generated by decision element 200 and represents a majority voted output determined from outputs 120.

In a preferred embodiment, signal generators 105 represent redundant signal generators. Preferably, signal generators 105 receive inputs 115 and perform operations substantially simultaneously. Additionally, signal generators generate outputs 120 and receive outputs 120 as feedback. Also, each signal generator is preferably coupled to feedback from at least one other signal generator. In a preferred embodiment of the present invention, each signal generator includes a selector (not shown) to select feedback (e.g., outputs 120) based on control information determined via an upset detected signal. In one embodiment of the present invention, signal generators 105 represent encryptors for encrypting red (e.g., plain text) data into black (e.g., clear text) data. In another embodiment, signal generators 105 represent decryptors for decrypting black (e.g., encrypted text) data into red (e.g., plain text) data. In another embodiment, signal generators 105 represent pseudo-noise generators.

In another embodiment, signal generators 105 rely on internal feedback (not shown) to determine an output, and therefore an SEU affects the internal state (e.g., sequence) of a signal generator. The present invention provides an apparatus and method for correcting the internal state of a signal generator experiencing an SEU by copying feedback from another signal generator. Thus, the present invention provides an apparatus and method for restoring the internal state of a signal generator experiencing an SEU. Additionally, when the internal state is corrected for the signal generator experiencing an SEU, the signal generator experiencing the SEU again receives its own internal feedback.

Figure 2:
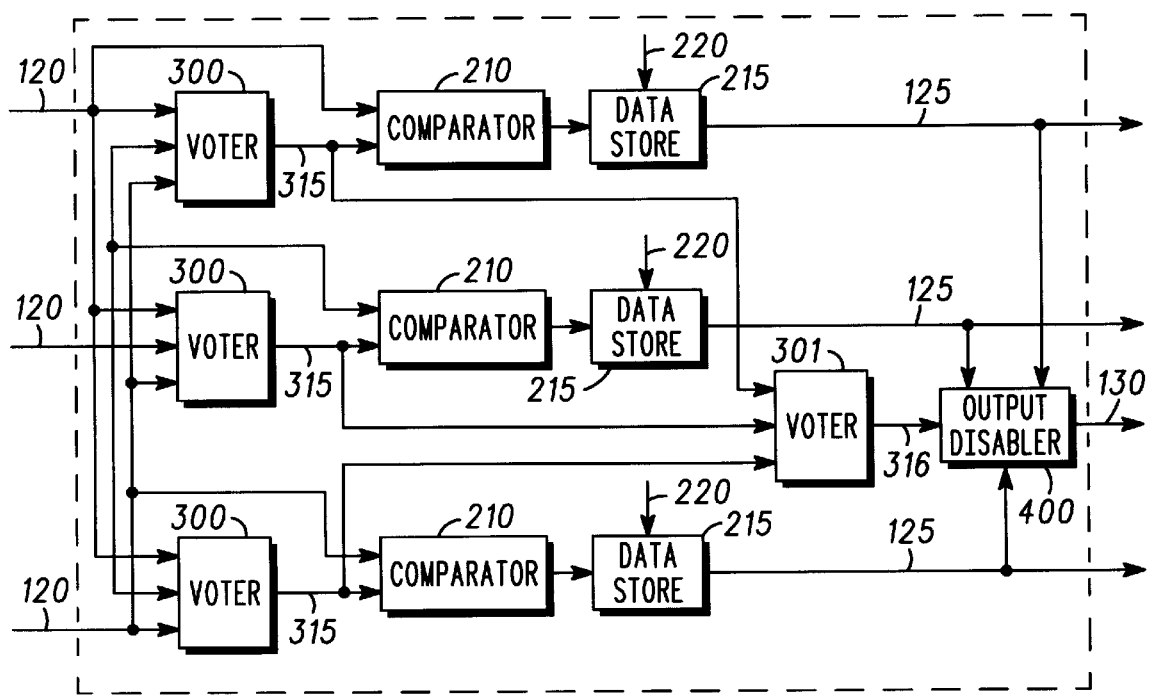
FIG. 2 is a simplified block diagram of a decision element in accordance with a preferred embodiment of the present invention.

FIG. 2 is a simplified block diagram of a decision element in accordance with a preferred embodiment of the present invention. Decision element 200 illustrates an apparatus for identifying and correcting an SEU. In a preferred embodiment, decision element 200 includes voters 300, comparators 210, data stores 215, and output disabler 400. Decision element 200 may be implemented in software; however, decision element 200 is preferably implemented using high speed logic such as differential GaAs and ECL.

In a preferred embodiment, three voters 300 receive outputs 120. Each of the three voters 300 are preferably individually coupled to comparators 210. Voters 300 preferably perform a majority voter operation on outputs 120. As discussed above, outputs 120 are preferably generated via individual signal generators 105 (FIG. 1). Preferably, intermediate voted outputs 315 couple three voters 300 to three comparators 210.

Each of comparators 210 preferably receives at least one intermediate voted output 315 and at least one output 120 and performs a compare operation on each of the received pairs. Results of the comparison (e.g., "1" or "0") are preferably stored in a corresponding one of data stores 215.

Preferably, data stores 215 are coupled to comparators 210. Additionally, data stores 215 provide upset detected signals 125 based on comparisons between at least one of outputs 120 and intermediate voter outputs 315. In one embodiment, an external element may reset or force a data value from data stores 215 via resets 220.

In a preferred embodiment, voter 301, similar to voters 300, receives each of intermediate voted outputs 315 and performs another majority voter operation. Preferably, voter 301 generates a second intermediate voted output 316 similar to intermediate voted outputs 315. Second intermediate voted output 316 couples voter 301 to output disabler 400. Also, upset detected signals 125 couple data stores 215 to output disabler 400. Preferably, output disabler 400 accepts second intermediate voted output 316 and determines when to inhibit second intermediate voted output 316 based on upset detected signals 125. Preferably, when a majority of upset detected signals 125 are asserted, output disabler 400 inhibits second intermediate voted output 316 from appearing on voted output 130.

In another embodiment, other numbers of voters 300, voter 301, comparators 210, data stores 215, and output disabler 400 may represent an apparatus for identifying and correcting an SEU.

Figure 3:
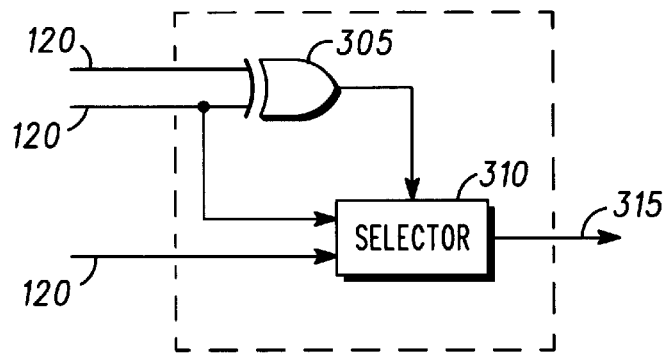
FIG. 3 is a simplified block diagram of a voter element in accordance with a preferred embodiment of the present invention.

FIG. 3 is a simplified block diagram of a voter element in accordance with a preferred embodiment of the present invention. In a preferred embodiment, this voter element represents one of voters 300 (FIG. 2). Preferably, a voter 300 comprises two primary elements, exclusive-or gate 305 and selector 310. The voter shown in FIG. 3 performs a majority voter operation. Preferably, the voter shown in FIG. 3 receives three inputs and provides one output.

In a preferred embodiment, exclusive-or gate 305 receives outputs 120 when coupled to an element other than a voter (e.g., signal generators 105 (FIG. 1)). Alternatively, exclusive-or gate 305 preferably receives intermediate voted outputs 315 when coupled to voters 300 (FIG. 2). Exclusive-or gate 305 performs a logical exclusive-or operation on received signals. Exclusive-or gate 305 provides a single output to selector 310.

Selector 310 receives outputs 120 when coupled to an element other than a voter (e.g., signal generators 105 (FIG. 1)). Alternatively, selector 310 receives intermediate voted outputs 315 when coupled to voters 300 (FIG. 2). Selector 310 is preferably controlled by a single output received from exclusive-or gate 305. A single output controls selector 310 to select one of two signals received by selector 310. Selector 310 preferably provides a single intermediate voted output similar to intermediate voted outputs 315 and second intermediate voted output 316.

Figure 4:
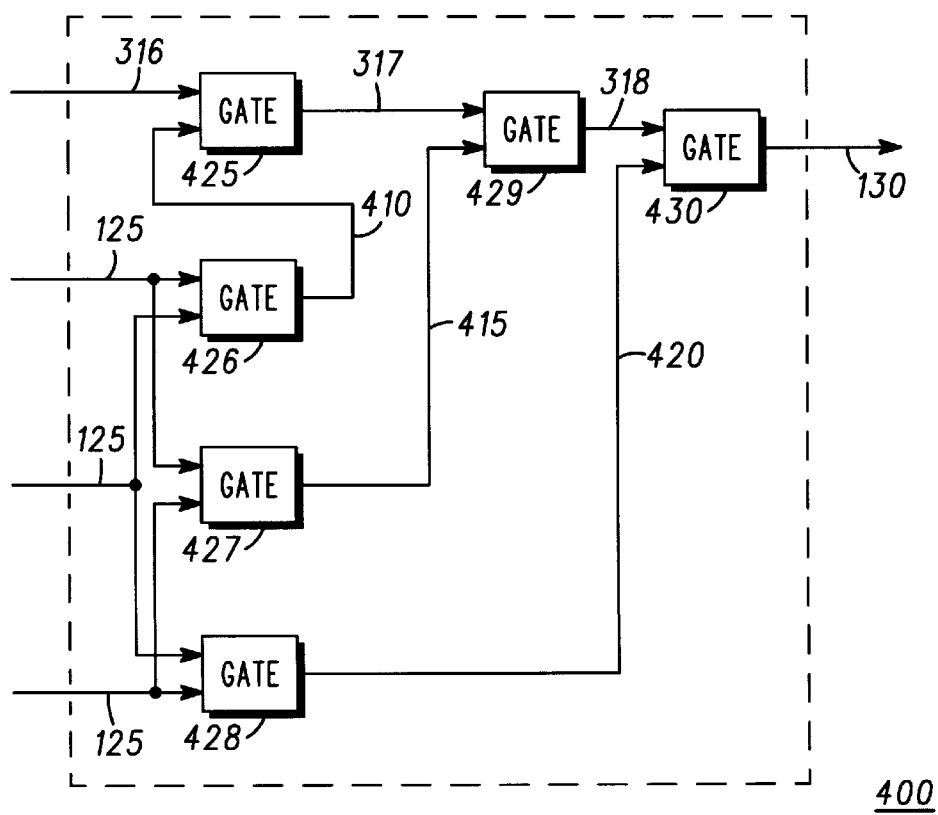
FIG. 4 is a simplified block diagram of an output disabler element in accordance with a preferred embodiment of the present invention.

FIG. 4 is a simplified block diagram of an output disabler element in accordance with a preferred embodiment of the present invention. Output disabler 400 illustrates an apparatus for inhibiting second intermediate voted output 316 from being presented to output 130 when a majority of upset detected signals are asserted. In a preferred embodiment, output disabler 400 is comprised of a plurality of gates 425–430. Preferably, each of gates 425–430 performs a logical AND operation.

In a preferred embodiment, gate 425 receives second intermediate voted output 316 from a voter. When gate 425 is enabled via enable signal 410, intermediate voted output 317 is propagated to gate 429. Preferably, enable signal 410 is determined by performing a logical AND operation via gate 426 on two independent upset detected signals 125 (e.g., a first and second upset detected signal). Similarly, enable signal 415 is determined by gate 427 based on two independent upset detected signals 125 (e.g., a second and third upset detected signal). Preferably, enable signal 415 controls intermediate voted output 317 between gate 425 and gate 429. Finally, enable signal 420 is determined by gate 428 based on two independent upset detected signals 125 (e.g., a first and third upset detected signal). Preferably, enable signal 420 controls intermediate voted output 318 between gate 429 and gate 430.

Figure 5:
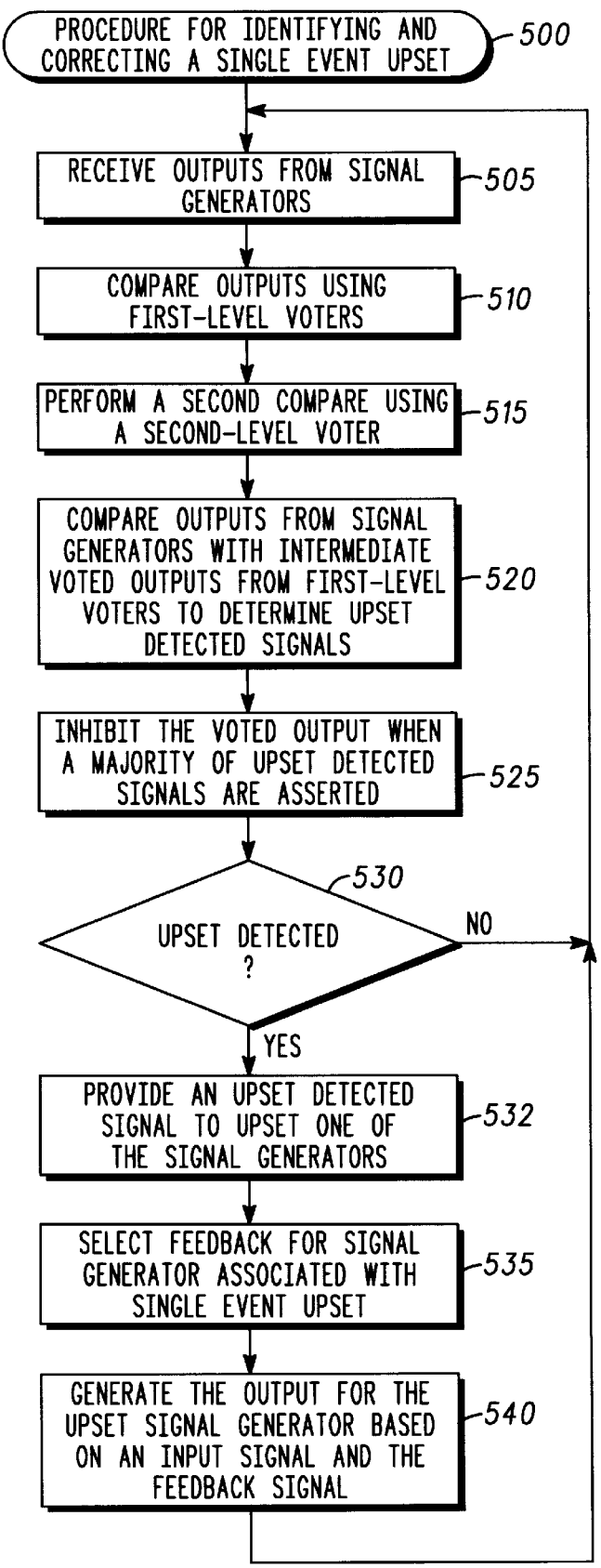
FIG. 5 is a simplified flow chart of a procedure for identifying and correcting an single event upset in accordance with a preferred embodiment of the present invention.

FIG. 5 is a simplified flow chart of a procedure 500 for identifying and correcting an single event upset in accordance with a preferred embodiment of the present invention. Preferably, procedure 500 is performed by a decision element receiving redundant outputs from a plurality of signal generators.

In task 505, outputs are received from signal generators. In a preferred embodiment, outputs from a plurality of signal generators are received by a decision element. Preferably, outputs from the plurality of signal generators are received substantially simultaneously.

In task 510, outputs are compared using first-level voters. In a preferred embodiment, a plurality of three voters perform a majority voting operation on three independent outputs from three independent, redundant signal generators. Each of the plurality of voters generates an intermediate voted output creating a preferred total of three intermediate voted outputs.

In task 515, a second compare is performed using a second-level voter. In a preferred embodiment, a voter performs a majority voting operation using the three intermediate voted outputs determined in task 510. Preferably, the majority voting operation performed in task 510 generates a second intermediate voted output representing a majority of inputs received by the second-level voter.

In task 520, outputs from signal generators are compared with intermediate voted outputs from first-level voters to determine upset detected signals. In a preferred embodiment, outputs from signal generators are compared with intermediate voted outputs from first-level majority voters to determine upset detected signals. When a signal generator output fails to compare with a majority voted output from a voter, a comparator asserts an upset detected signal. When a signal generator output compares with a majority voter output from a voter, a comparator does not assert an upset detected signal. Preferably, task 520 is performed using three independent comparators receiving independent inputs and generating independent outputs.

In task 525, the voted output is inhibited when a majority of upset detected signals are asserted. In a preferred embodiment, when a majority (e.g., 2-of-3) of upset detected signals are asserted in task 520, output is inhibited from a decision element. Alternatively, when a minority of upset detected signals are asserted in task 520, output (e.g., second intermediate voted output (task 515)) from a second-level voter is provided as output from a decision element. Preferably, task 525 is performed by an output disabler. In one embodiment of the present invention, task 525 is optional.

In task 530, another check for upset detected signals is performed. Preferably, when no upset detected signal is asserted, a signal generator receives feedback from an output associated therewith, and then task 505 is performed. Alternatively, when an upset detected signal is asserted, task 532 is performed.

In task 532, an upset detected signal is provided to an upset one of the signal generators. In a preferred embodiment, when an upset detected signal is asserted, an upset detected signal is returned to a corresponding signal generator. Preferably, an upset detected signal is asserted until the signal generator experiencing an SEU produces an output corresponding to output from signal generators unaffected by an SEU.

Preferably, execution order of task 525 is interchangeable with tasks 530–532.

In task 535, feedback is selected for a signal generator associated with an single event upset. In a preferred embodiment, when an upset detected signal is asserted, an associated signal generator selects feedback from another signal generator. Preferably, a signal generator selects feedback from another signal generator while an associated upset detected signal is asserted.

In task 540, an output for the upset signal generator is generated based on the input signal and the feedback signal. In a preferred embodiment, a signal generator experiencing an SEU receives feedback from another signal generator (task 535). Additionally, each signal generator preferably receives input from a source external to the signal generator. Preferably, the signal generator experiencing an SEU generates an output based on the feedback from another signal generator and input from an external source. In a preferred embodiment, when the signal generator which experienced an SEU again produces an output corresponding to the output of signal generators unaffected by an SEU, the signal generator which experienced the SEU switches to receive feedback from its own output.

Thus, what has been shown are a system and method tolerant to an SEU. What has also been shown are a system and method capable of maintaining synchronization between a transmitter and a receiver after experiencing an SEU. What has also been shown are a system and method which maintain continuous communications between a transmitter and a receiver following an SEU. Also shown is a voter system which is tolerant of hard failures.

An single event upset tolerant system and method have been described which overcome specific problems and accomplish certain advantages relative to prior art methods and mechanisms. The improvements over known technology are significant. The high cost and complexities of lost data due to a loss of synchronization between a transmitter and a receiver are avoided. Similarly, a risk of experiencing a hard failure in a voter element is overcome.

The foregoing description of the specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. An encryption system comprising:
   a plurality of redundant encryptors, each for encrypting redundant black data into red data each encryptor having an output; and
   a decision element for receiving the output from each of the plurality of encryptors, and
   when an upset output for an upset one of the plurality of encryptors fails to compare with the output for a remainder of the plurality of encryptors, controlling feedback to the upset one of the plurality of encryptors to restore the upset encryptor to a correct state.

2. An encryption system as claimed in claim 1 wherein the decision element comprises:
   a plurality of first voters for performing a majority voter operation on the output from each of the plurality of encryptors and generating a first voter output; and
   a second voter for performing a majority voter operation on the first voter output for each of the plurality of first voters and generating a second voter output representing the voted output of the plurality of encryptors; and
   an output disabler for inhibiting the second voter output when a majority of the plurality of upset outputs are asserted.

3. A system comprising:
   a plurality of signal generators each having an output; and
   a decision element for receiving the output from each of the plurality of signal generators, and
   when an upset output for an upset one of the plurality of signal generators fails to compare with the output for a remainder of the plurality of signal generators, controlling feedback to the upset one of the plurality of signal generators to correct the upset output, and wherein the decision element further comprises:

a plurality of comparators wherein each of the plurality of comparators receives the voter output from at least one of the plurality of voters and the output from at least one of the plurality of signal generators to generate an upset detected signal for each of the plurality of comparators; and an output disabler for controlling the second voter output based on the upset detected signal from each of the plurality of comparators.

4. A system as claimed in claim 3 wherein each of the plurality of signal generators includes:

means for receiving the output for each of the plurality of signal generators;

means for selecting at least one output of the plurality of signal generators based on the upset detected signal from at least one of the plurality of comparators; and means for correcting the upset output for the upset one of the plurality of signal generators based on the output of the remainder of the plurality of signal generators and a current input to the upset one.

5. A system as claimed in claim 3 wherein the output disabler comprises a plurality of gates for receiving upset detected signals from the plurality of comparators and allows the second voter output to represent the output of the plurality of signal generators when a minority of the upset detected signals are asserted.

6. A system comprising:

a plurality of signal generators each having an output; and a decision element for receiving the output from each of the plurality of signal generators, and when an upset output for an upset one of the plurality of signal generators fails to compare with the output for a remainder of the plurality of signal generators, controlling feedback to the upset one of the plurality of signal generators to correct the upset output, and wherein each of the plurality of voters comprises:

an exclusive-or gate for receiving a first input and a second input and generating a gated signal; and a selector for receiving the second input and a third input and determining the voter output based on the second input and the third input and controlled by the gated signal.

7. A system comprising:

a plurality of signal generators each having an output; and a decision element for receiving the output from each of the plurality of signal generators, and when an upset output for an upset one of the plurality of signal generators fails to compare with the output for a remainder of the plurality of signal generators, controlling feedback to the upset one of the plurality of signal generators to correct the upset output, and wherein the voter comprises:

an exclusive-or gate for receiving a first input and a second input and generating a gated signal; and a selector for receiving the second input and a third input and determining the second voter output based on the second input and the third input and controlled by the gated signal.

8. A decision element comprising:

a plurality of first voters each generating a voted output from an encrypted data signal from each of a plurality of redundant encryptors;

a second voter for receiving the voted output from each of the plurality of first voters and generating a second voted output; and a comparator for providing an upset detected signal to one of the redundant encryptors when the voted output of one of the first voters fails to compare with the encrypted data signal from said one redundant encryptor, the upset detected signal restoring said one redundant encryptor to a correct state.

9. A decision element as claimed in claim 8 further comprising a plurality of comparators each corresponding with one of the first voters, each comparator receiving the voted output from one of the plurality of first voters and a corresponding one of the encrypted data signals, each of the plurality of comparators generating an upset detected signal when the voted output and the corresponding encrypted data signal fail to compare, the upset detected signal being provided to the redundant encryptor providing the corresponding encrypted data signal.

10. A decision element as claimed in claim 9 wherein the upset detected signal from each of the plurality of comparators is supplied to a corresponding of the redundant encryptors to determine, in part, the encrypted data signals.

11. A decision element comprising:

a plurality of voters each having a voted output and a plurality of inputs;

a voter for receiving the voted output from each of the plurality of voters and generating a second voted output;

a plurality of comparators each receiving the voted output from at least one of the plurality of voters and at least one of the plurality of inputs, each of the plurality of comparators generating an upset detected signal when the voted output and at least one of the plurality of inputs fail to compare; and an output disabler to inhibit the second voted output of the decision element when a majority of upset detected signals are asserted.

12. A decision element as claimed in claim 11 wherein the output disabler comprises a plurality of gates for receiving upset detected signals and allowing the second voted output to represent the plurality of inputs when a minority of the upset detected signals are asserted.

13. A decision element comprising:

a plurality of voters each having a voted output and a plurality of inputs; and a voter for receiving the voted output from each of the plurality of voters and generating a second voted output, and wherein each of the plurality of voters comprises:

an exclusive-or gate for receiving a first input and a second input and generating a gated signal; and a selector for receiving the second input and a third input and determining the voted output based on the second input and the third input and controlled by the gated signal.

14. A decision element comprising:

a plurality of voters each having a voted output and a plurality of inputs; and a voter for receiving the voted output from each of the plurality of voters and generating a second voted output, and wherein the voter for generating the second voted output comprises:

an exclusive-or gate for receiving a first input and a second input and generating a gated signal; and a selector for receiving the second input and a third input and determining the second voted output based on the second input and the third input and controlled by the gated signal.

15. A method for identifying and correcting an single event upset from an output of an upset one of a plurality of redundant encryptors, the method comprising the steps of:

receiving encrypted outputs from the plurality of redundant encryptors;

comparing the encrypted outputs from each of the plurality of redundant encryptors in a plurality of first voters to create a first voted output corresponding with each redundant encryptor;

performing a second comparing step of the plurality of first voted outputs in a second voter to create a second voted output for the plurality of redundant encryptors;

identifying the single event upset based on the second voted output; and correcting the subsequent encrypted output of the upset one of the plurality of redundant encryptors, the upset redundant encryptor determined based on a comprison between the first voted outputs and the encrypted outputs of the corresponding redundant encryptor.

16. A method as claimed in claim 15 wherein the performing the second comparing step further comprises the steps of:

comparing each of the plurality of first voted outputs with the encrypted outputs of the plurality of redundant encryptors to determine an upset detected signal corresponding with each redundant encryptor; and inhibiting the second voted output when a majority of the upset detected signals are asserted.

17. A method for identifying and correcting an single event upset from an output of an upset one of a plurality of signal generators, the method comprising the steps of:

receiving outputs from the plurality of signal generators;

comparing the outputs from the plurality of signal generators in a plurality of voters to create a plurality of voted outputs;

performing a second comparing step of the plurality of voted outputs in a voter to create a voted output for the plurality of signal generators;

identifying the single event upset based on the voted output; and correcting the output of the upset one of the plurality of signal generators, the correcting step comprising the steps of:

providing an upset detected signal to the upset one of the plurality of signal generators;

selecting a feedback signal for the upset one of the plurality of signal generators based on the upset detected signal associated therewith; and generating the output for the upset one of the plurality of signal generators based on an input signal and the feedback signal associated therewith.

* * * * *